Figure 7:
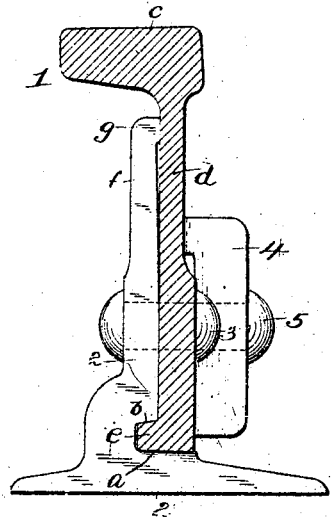

(No Model.) 5 Sheets—Sheet 1.
A. H. EMERY.
CONSTRUCTING AND ASSEMBLING RAILWAY RAILS, THEIR JOINTS, AND CHAIRS.
No. 496,555. Patented May 2, 1893.
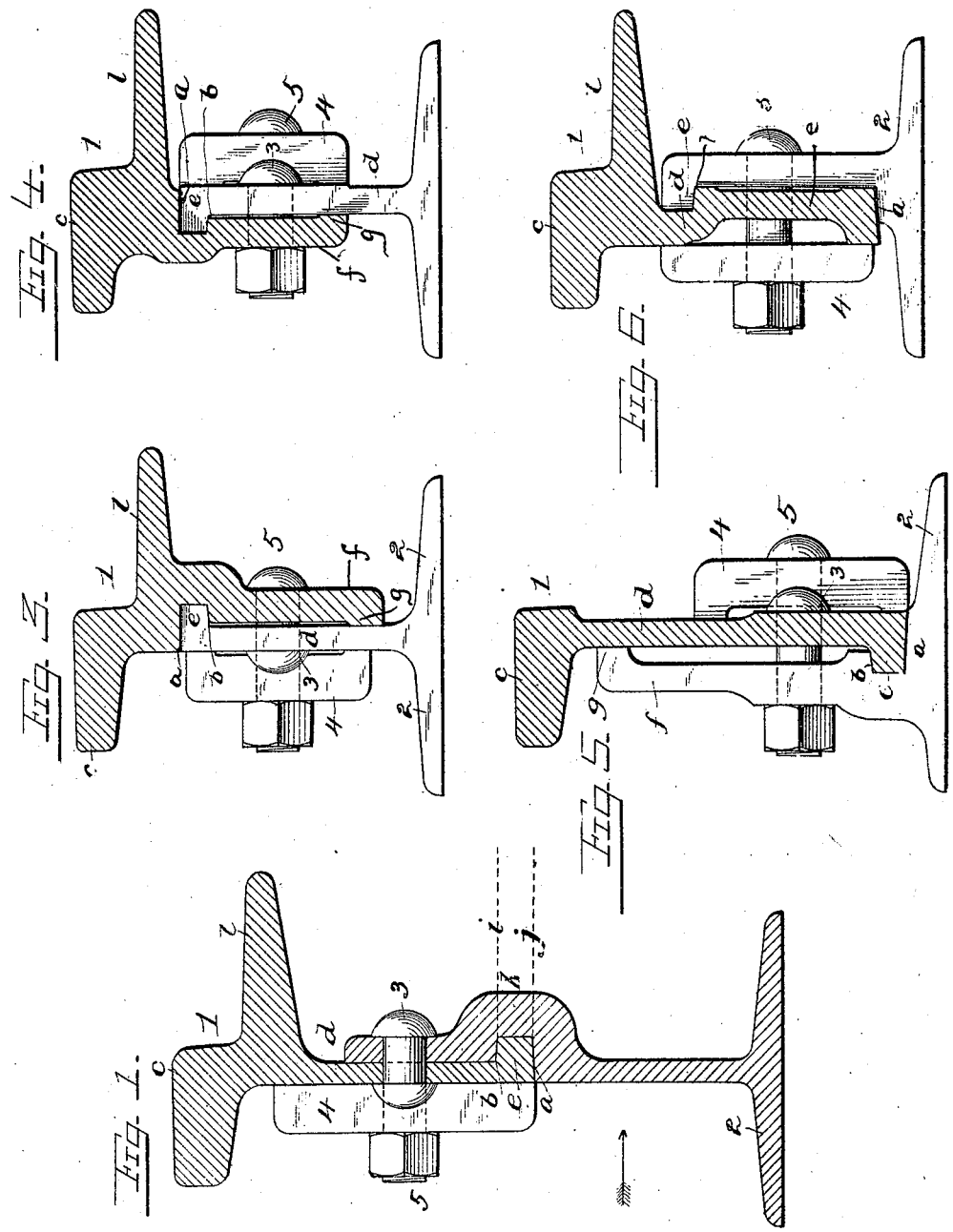

(No Model.) 5 Sheets—Sheet 2.
A. H. EMERY.
CONSTRUCTING AND ASSEMBLING RAILWAY RAILS, THEIR JOINTS, AND CHAIRS.
No. 496,555. Patented May 2, 1893.
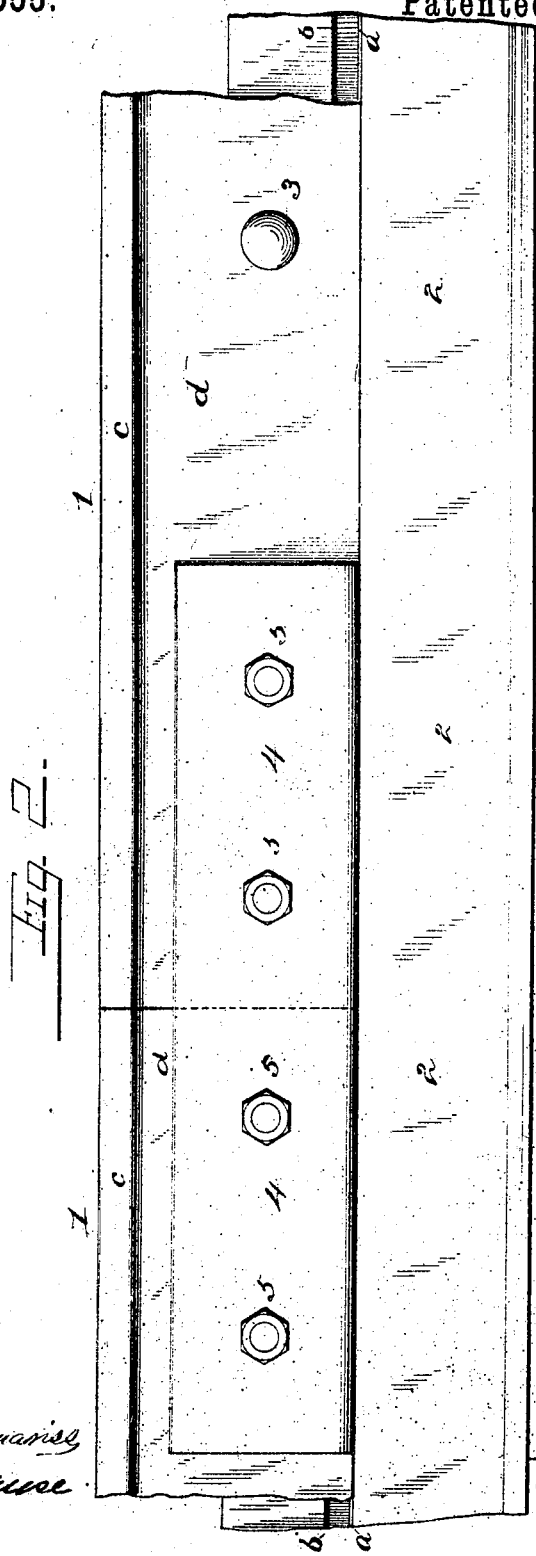
Attest.
Walter Jameson
Geo. E. Cruse
Inventor:
A. H. Emery
By Knight Bros.
Attys (No Model.)  5 Sheets—Sheet 3.

A. H. EMERY.
CONSTRUCTING AND ASSEMBLING RAILWAY RAILS, THEIR JOINTS, AND CHAIRS.

No. 496,555.  Patented May 2, 1893.

Attest:
Walter Tamarise
Geo. E. Cruse

Inventor:
A. H. Emery
By Knight Bros.
Attys.

(No Model.) 5 Sheets—Sheet 4.
A. H. EMERY
CONSTRUCTING AND ASSEMBLING RAILWAY RAILS, THEIR JOINTS, AND CHAIRS.
No. 496,555. Patented May 2, 1893.
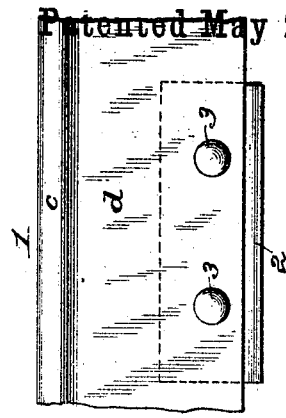
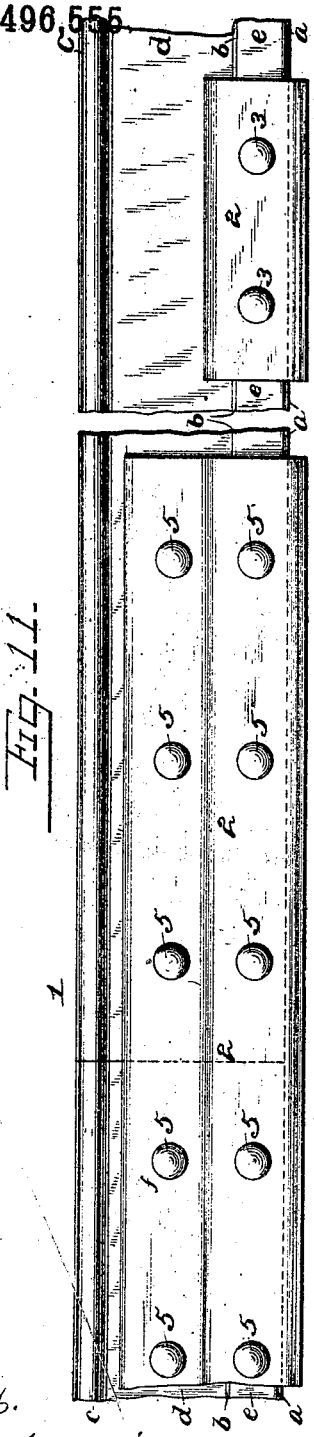
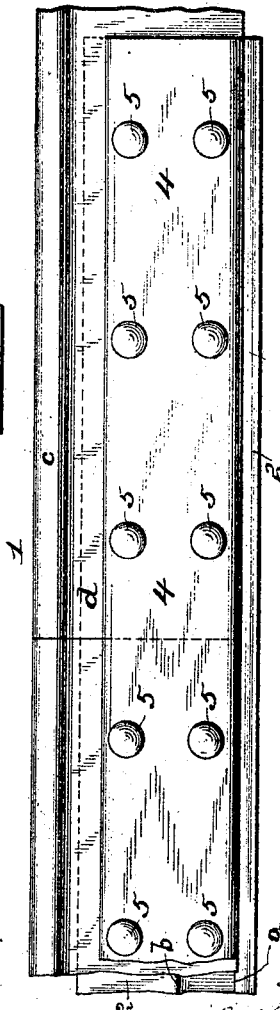

(No Model.) 5 Sheets—Sheet 5.
A. H. EMERY.
CONSTRUCTING AND ASSEMBLING RAILWAY RAILS, THEIR JOINTS, AND CHAIRS.
No. 496,555. Patented May 2, 1893.
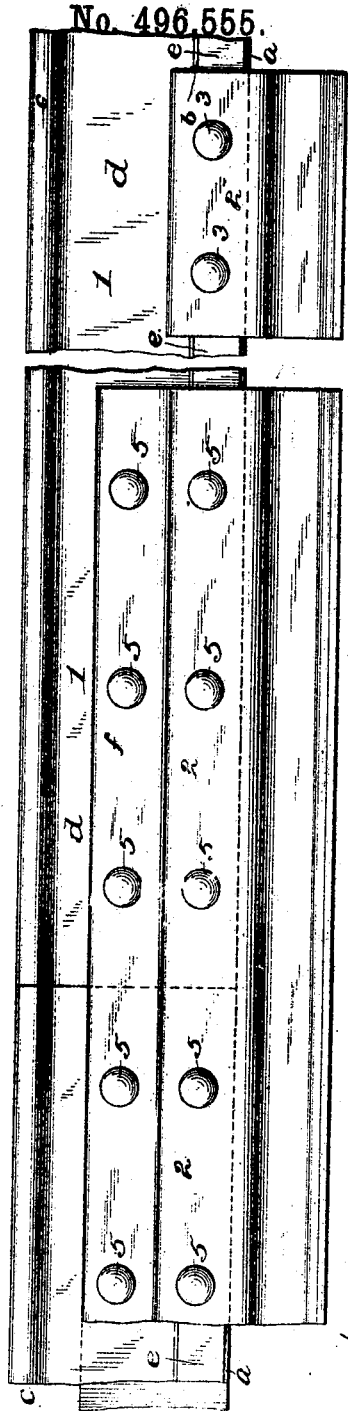
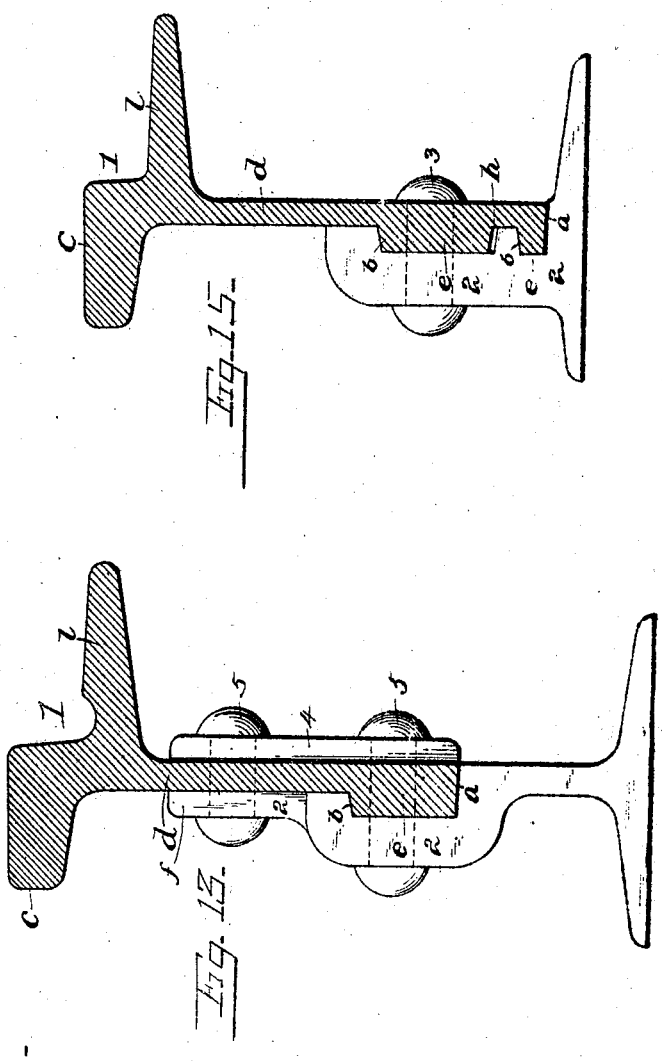
Attest:
Walter Jameson
Geo. E. Cruse
Inventor:
A. H. Emery
By Knight Bros.
Attys.

UNITED STATES PATENT OFFICE.

ALBERT H. EMERY, OF STAMFORD, CONNECTICUT.

CONSTRUCTING AND ASSEMBLING RAILWAY-RAILS, THEIR JOINTS AND CHAIRS.

SPECIFICATION forming part of Letters Patent No. 496,555, dated May 2, 1893.

Application filed April 19, 1892. Serial No. 429,982. (No model.)

*To all whom it may concern:*

Be it known that I, ALBERT H. EMERY, a citizen of the United States, residing at Stamford, in the county of Fairfield and State of Connecticut, have invented new and useful Improvements in the Art of Constructing and Assembling Railway-Rails, their Joints and Chairs, of which the following is a specification.

My invention is applicable to the construction and combining of the parts of compound railway-rails, as well as to the construction and combining of simple rails with their joint-plates and chairs; the same principle being incident to both uses of the invention as will appear.

In carrying out my invention, the respective parts to be united, whether they be two parts of a continuous compound rail, or a simple rail and its joint plates and chairs, are so constructed and combined, that they have between them, a single load-bearing seat which receives the entire vertical load which is put upon the rail, and one for more pressure inducing seats, which establish and maintain an initial and continuous pressure upon the load-bearing seat, so as to make a perfectly firm bearing, and prevent any movement between and consequently any wear on, the meeting faces of the parts. This result can practically only be obtained by the use of a single load-bearing seat, or plane of contact between those parts which receive the vertical load put upon the rail. If two such seats are employed, there is in practice, usually no contact or an imperfect contact upon one or the other at any given point.

The respective parts to be combined are constructed with a lug or flange, and a recess smaller in width than the flange, said flange and recess being formed with inclined faces, and the parts being forced one into the other by heavy pressure. In forcing the wedge-shaped flange into the wedge-shaped recess, a heavy initial pressure is put upon their opposite faces. One of these will receive the load put upon the rail and is therefore the load-bearing seat, and the other I call the pressure-inducing seat. The planes of these seats are inclined at a very small angle, and so much less than the angle which would induce slipping, that the parts are firmly held together. To secure them against separation by jars or lateral strains, they are bolted or riveted together, and these bolts or rivets may be supplemented by suitable fish-plates at the joints. Whether the lower member of the rail be a part of a continuous compound rail or a chair, or joint-plate, the principle of combining is the same.

My invention relates also to certain features relative to the location of the bolts or rivets and construction of the joint-plates, all of which will be hereinafter fully described and particularly pointed out in the claims.

My invention is illustrated by the accompanying drawings containing fifteen figures, in which the parts are numbered from 1 to 5 inclusive, like numbers and letters indicating like or corresponding parts throughout the several views, and in which:—

1 is the upper member or tread portion of the rail proper when the rail is not compound; 2, the lower member if the rail is compound, or the joint-plate and chair if the rail is not compound; 3, the rivets or bolts which secure the parts 1 and 2 of the compound rail together, or the rail 1 and chairs 2, when the rail is not compound; 4, the fish-plate and 5, the rivets or bolts which secure the parts 1, 2 and fish-plate 4 together.

Figure 1 shows a compound rail of deep-section for use with deep-paving and to which my invention is applied. Fig. 2 is a side elevation of the same, on a smaller scale, looking in the direction of the arrow, Fig. 1. Figs. 3 to 10 inclusive are vertical transverse sections, of rails, in which various forms of my invention are used for combining the rail proper or tread-portion with chairs and joint-plates which are shown in elevation as will hereinafter be fully described in detail. Figs. 11 and 12 are side elevations, showing respectively the outer or joint-plate side and inner or fish-plate side of the form shown by Fig. 10. Fig. 13 shows a vertical transverse section of a simple rail 1, the chair and joint-plate 2 and fish-plate 4 being shown in elevation. Fig. 14 shows a side elevation of the same, from the joint-plate or outer side of the rail and showing both a joint-plate and chair. Fig. 15 shows a vertical transverse section, of a rail 1 and chair 2 in elevation, where the flange extending from the rail into the chair is of modified form. The upper member or tread-portion 1 has a tread c upon which the wheel runs, but in all the views except in Figs. 5, 7 and 10 I have shown a flange e, which stiffens the rail and provides a convenient tread for the wheels of vehicles.

In all the views there is shown what I term the load-bearing face, a, which in addition to the initial pressure put upon it in assembling, receives the entire vertical load put upon or passing over the rail. In Figs. 3 and 4, this load-bearing face a is shown at the top of the lower member 2, while in all the other figures, this load-bearing seat a is shown at the bottom of the upper member or tread-portion 1. This load-bearing face a is on the upper side of the flange e in Figs. 3 and 4 and on the lower side of the flange e, in all the other figures. This flange e is shown in Figs. 3 and 4, projecting from the lower member 2, into a recess in the upper member 1, while in all the other figures the flange e is shown projecting from the web d, into the recess in the lower member 2, this flange in all these cases being at the bottom of the member 1 of the rail, and projecting from one side of the web d, into the lower member 2. This flange has a face b opposite the face a, the plane of which is slightly inclined to that of the face a, forming a wedge which is forced by heavy pressure into the similarly formed but somewhat smaller recess in the other member. The faces a and b being thus inclined, and the recess being smaller than the flange e, which is forced into it, a heavy initial pressure is put upon both these opposing faces. a is the load-bearing face as before mentioned and b I call the pressure-inducing surface because in forcing these parts together when thus constructed a heavy pressure is induced on both these surfaces. That this pressure shall be continuous, the angle between the planes of the seats must be much less than the angle which would cause the parts to slip from each other. This angle should be very small but not so small but that the flange would readily enter the recess and still tighten firmly in being forced to its seat. Either one of these faces may be normal to the plane of the web d of the tread-portion 1, and the wedging produced by the inclination of the other as shown in Figs. 3, and 4; but I prefer that construction in which both these faces are inclined as shown in all the other figures. The construction may be made with the two faces parallel and the flange e slightly larger then the recess into which it is made to go, in which case, for convenience in assembling the entering corners of the flange, should be rounded or beveled.

In Fig. 15 is shown the modification in which the flange e is divided into two parts giving two initial pressure-inducing surfaces instead of one, the combined pressure of which will be received and borne by the load-bearing surface a. The difficulty, however, in making the flange e with two pressure-inducing seats is so great as to render its adoption undesirable. To insure pressure on the seat a Fig. 15 a portion of the flange e, is cut away at h, so that it shall not bear upon the part 2 at that point.

In constructing the parts, they are rolled hot in the usual way, care being taken that the flange e is larger than the recess into which it is to go. If the rail is a compound rail, the work will be much facilitated by cold rolling or cold-pressing the load-bearing and pressure-inducing surfaces of both the flange e and the recess into which it is to go, bringing these bearing surfaces to the same angle, and the fitting parts to finished size, so as to require them to be forced but a very small distance in assembling in the field for final use. This same cold rolling of the upper member 1, and lower member 2 will facilitate the assembling of the parts also, when the part 2 is not a continuous rail but is sawed up to form chairs and joint plates as illustrated in all the figures shown, excepting Figs. 1 and 2. The cold-rolling of the pressure bearing surfaces of these two parts may be replaced by planing, milling, or grinding. Ordinarily in the case of compound rails I prefer the cold rolling as mentioned, before sending the parts to the field for assembling in place, but in case the lower member 2 is not continuous, as illustrated in all the figures except 1 and 2, but is sawed up to form joint-plates and chairs, it will usually be found most economical to dispense with the cold-rolling, pressing, grinding, planing or milling of these parts, before assembling, special care being taken during finishing of the hot-rolling that the entering flange e and its corresponding seat in the other member are of such relative sizes that when forced together there will be heavy pressure on the bearing faces, a, and b, but using care also that there is not so much difference between this flange and its recess, but that the flange may be forced to its seat without undue distortion of either the flange or its seat or the part which contains the seat. Usually the upper member 1 would be made of harder steel than the lower member or members 2, the flange e in this case being usually distorted while assembling to little extent if any beyond its elastic limit.

The part 2 must have its recess small enough to cause the pressure on the bearing surfaces a and b, when parts 1 and 2 are fully assembled, to strain the part 2 around the flange e, nearly or quite up to its elastic limit. To accomplish this without the cold-rolling or other cold-fitting, the flange e, will best be made so large, relatively to the recess into which it is to be forced, that in forcing the parts together, the bearing surfaces or seats a and b are forced apart to an extent beyond that permitted by the elastic limit of the metal. In this case, unless the metal in which the recess is formed is properly supported the part containing said recess will be unduly distorted. It should therefore be so supported while the parts are being forced together that the whole of the metal connecting the seats $a$ and $b$ opposite the flange $e$ and included between the dotted lines $i$ and $j$, Fig. 1 will be stretched permanently without undue distortion of the lower member 2, and after the metal is removed from the press, that part of the metal between the lines $i$ and $j$ Fig. 1 will have strains of tension in the metal next to the flange $e$ and compression on the outer part at $k$, the same as would be the case if the flange $e$, fitted tightly without being large enough to give a permanent stretch to the metal between the lines $i$ and $j$, but these strains will be somewhat larger than if the metal had received no permanent set or stretch. After the parts 1 and 2 are forced together, notwithstanding the faces $a$, and $b$ are so slightly inclined that friction of pressure on these surfaces will hold these parts tightly together, they must be riveted or bolted together by the rivets or bolts 3 and 5, to prevent separation by lateral shocks or strains.

Where a deep paving is required, wooden stringers may be dispensed with and the rails spiked directly to the cross-ties, by making the lower member 2 high, as shown in Figs. 1, 2, 13 and 14. In Figs. 1 and 2 the lower member is shown as a continuous rail, while in Figs. 13 and 14 the member 2 is composed of joint-plates and chairs 2.

The chairs and joint-plates shown in all the figures except Figs. 1 and 2 may both be made from the same bars, and have similar sections requiring one set of rolls for their production, or they may be sawed from bars of different sections as shown in Figs. 8, 10, 11, 12, 13 and 14.

Figure 9:
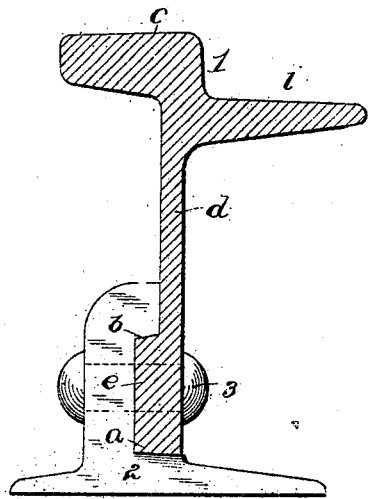
Figure 10:
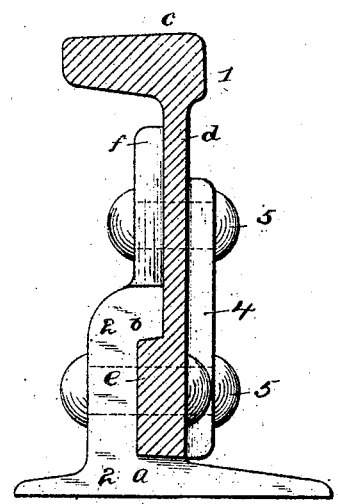

In Fig. 9, I have shown a chair also secured to the upper member while Fig. 7 shows a joint-plate connecting two upper members 1 with a fish-plate 4 covering the joint.

Figure 8:
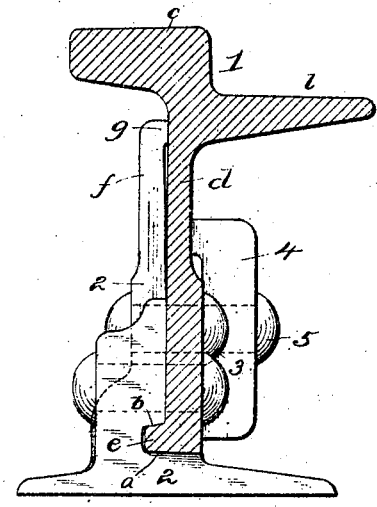

Fig. 8 shows the upper member in section with a low chair 2, in elevation, secured to the upper member by rivets 3 while behind this chair and rivets is shown a joint-plate 2 and fish-plate 4 secured to two adjoining members 1 by rivets 5.

In Figs. 5, 7, 8, 10, 11, 12, 13 and 14 the joint-plate is much higher than is needed for a chair and has an extension $f$ which reaches up nearly to the tread $c$. This makes the joint-plate much stiffer, and supports the rails better than if low. In case the joint-plate is secured to the upper member 1, by a single row of rivets or bolts 5, as shown in Figs. 5, 7 and 8, the extension $f$ of the joint-plate 2, is provided with a lug $g$ which rests against the member 1, whereby lateral support is afforded the upper member 1, at the upper edge of the joint-plate 2. Where two rows of rivets or bolts 5 are used, as shown in Figs. 10, 11, 12, 13 and 14 the lug $g$ is not needed as the joint-plate is held tightly against the member 1, at its upper edge by the upper row of rivets or bolts 5.

In Figs. 10 to 14 inclusive the fish-plate 4, is shown the same length as the joint-plate 2 and secured to the rail 1 by two rows of rivets 5, while in Figs. 3, 4, 5, 6, 7 and 8 the fish-plates and joint-plates are secured to the rail 1 by a single row of rivets or bolts 5. When the joint-plates are wide as shown in Figs. 10, 11, 12, 13 and 14 and are about one yard or more long with the flange $e$ tightly fitting in the recess in the joint-plate 2 as described, the rail and joint-plate are here much stiffer than is the solid rail itself away from the joint and this joint is made still firmer by the use of the fish-plate 4 so that by this construction, we may make a continuous rail which is stiffer and stronger at the joint than elsewhere and so stiff and firm at the joint that there is no sliding or working of any part when the wheels pass over it. This joint is readily put together so firmly that when buried in the ground up to the flange $e$ or tread $c$ as they usually are, the changes of temperature which occur from time to time will not give strains of tension or compression to the rail sufficient to cause slipping at the joint often if at all.

In some of the figures, the flange $e$ is shown as a narrow wedge and secured in position by bolts or rivets 3 and 5 which are to one side thereof and not passing through the flange. In case of jars or lateral shocks, the flange $e$ will be better sustained in its place and there is much less danger of distorting in assembling if the bolts or rivets 3 or 5 pass directly through the flange between the bearing seats, $a$ and $b$, which is accomplished by making a wide wedge as shown in Figs. 6, 9, 10, 11, 12, 13, 14, and 15. In case the lower rail or rails are not continuous but are sawed up into joint-plates and chairs, the chairs should be assembled with the upper rails in the mill or shop, the adjoining members being suitably punched, and forced together by a strong press and bolted or riveted as shown. The joint-plate will necessarily be pressed to its seat on the adjoining ends of the rails, at the time of assembling and then permanently secured by bolting or riveting.

By the term "lower member" I refer to that part of the structure which transmits the entire load from the upper member which receives it, to the cross-ties or stringers, and it may be the continuous rail or the joint-plate or the chair. The cross section of this lower member and the manner of combining the same with the upper member may be the same, whether it be a continuous rail, a joint plate or a chair.

Having thus described my invention, the following is what I claim as new therein and desire to secure by Letters Patent:

1. In a railway rail, the combination of the tread-portion 1 receiving the whole load put upon the rail, and the base-portion 2, transmitting the whole of the same to the ties or stringers, one of which has a recess and the other of which has a slightly wedging flange forced tightly into said recess; whereby the load-bearing seat *a* and the pressure-inducing-seat *b* receive the initial and continuous heavy pressure causing the parts to seize each other firmly, as explained.

2. In a railway rail, the combination of the tread-portion 1, and the base-portion 2, provided one with a flange and the other with a recess; said flange and recess being wedge-shaped and formed with a load-bearing seat *a* and the initial pressure-inducing seat *b*, slightly inclined to each other whereby when forced together heavy pressure is put upon the bearing faces of these seats *a* and *b*, causing the parts to seize each other and hold firmly together, substantially as and for the purpose set forth.

3. In a railway rail, the combination of the tread-portion 1, and the base-portion 2, formed each with a deep vertical web giving vertical stiffness at all points of the rail, one being provided with a wedge-shaped flange and the other having a corresponding recess into which said flange tightly fits, said flange and recess having between them the load-bearing seats *a* and the pressure-inducing-surfaces, *b*, the angle between the planes of which is too small to induce slipping whereby the heavy pressure put upon these parts by forcing them together, causes them to firmly seize each other, substantially as and for the purpose set forth.

4. In a railway rail, the combination of the tread-portion 1, or rail proper, and the base-portion 2, provided one with a flange and the other with a recess; said flange and recess being slightly wedge-shaped and forming the load-bearing seats *a* and the pressure-inducing seats *b*, the plane of the load-bearing seats *a* being nearly or quite normal to the web of the rail substantially as hereinbefore explained.

5. In a railway rail, the combination of the tread-portion 1, and the base-portion 2, each formed with a deep vertical web giving vertical stiffness at all points, one being provided with a slightly wedge-shaped flange and the other having a corresponding recess into which said flange tightly fits when forced together, said flange and recess having between them the load-bearing seat *a* and the pressure-inducing seat *b*, and the securing bolts or rivets passing through said parts between the seats *a* and *b*, the plane of said load-bearing seat being nearly or quite normal to the web of the rail, substantially as and for the purpose set forth.

6. A railway rail consisting of the tread *c*, the vertical web *d* and a lateral flange *e* on said web, formed with a load-bearing seat *a* and a pressure-inducing seat *b*, the planes of said seats being slightly inclined to each other, substantially as and for the purpose set forth.

7. A railway rail consisting of the tread *c*, and the vertical web *d* having the lateral flange *e* with a pressure-inducing seat *b*, and a load-bearing seat *a* at the bottom of the web; the planes of the faces of said seats *b* and *a* having slight inclination to each other, substantially as set forth.

8. A railway rail consisting of the tread *c*, the vertical web *d* and the lateral flange *e* at the bottom of said web, formed with the load-bearing seat *a* and the pressure-inducing seat *b*, the planes of said seats being slightly inclined to each other, substantially as set forth.

9. The combination of a railway rail, consisting of the tread *c* and the vertical web *d*, having a lateral flange *e* formed at the bottom of the web with the load-bearing seat *a* and the pressure-inducing seat *b*, whose planes are at a slight angle to each other; and the chair or joint-plate 2 having a recess formed with seats fitting the load-bearing and pressure-inducing seats on the flange, substantially as and for the purpose set forth.

10. In a railway rail, the combination with the tread-portion consisting of the tread *c* and the vertical web *d* having a lateral flange *e* formed with the load-bearing seat *a* and the pressure-inducing seat *b*; of the lower member 2, having a recess formed with seats fitting the load-bearing and pressure-inducing seats, on the flange, and the vertical extension *f* for stiffening the lower member and bracing the web *d*, substantially as set forth.

11. In a railway rail, the combination with the tread portion 1, consisting of the tread *c*, the web *d*, and the flange *e* formed with the load-bearing and pressure-inducing seats *a* and *b*; of the lower member 2, having a recess formed to receive said flange as explained and having the extension *f* for stiffening the lower member and bracing the web; said tread-portion and lower member being secured together by the bolts or rivets 5 passing through the flange *e*, and through the extension *f*, for the purpose set forth.

12. In a railway rail, the combination of the tread-portion 1, consisting of the tread *c*, the web *d*, and the flange *e*; the lower member or base-portion 2 recessed to receive the flange *e*, having the extension *f* and secured to the tread-portion by means of the bolts or rivets 5; said extension having the boss *g* for maintaining at its upper end the bearing on the web *d*, as explained.

13. In a railway rail, the combination of the adjoining tread-portions 1, the lower member or base-portion 2, formed with a single load-bearing seat *a*, and a single pressure-inducing seat *b* between them, substantially as explained and the clamping fish-plate 4, bearing upon the web of the tread portions for the purpose set forth.

14. A railway rail, consisting of the tread-portion 1, and the base-portion 2; one of said parts having a slightly wedging lateral flange, and the other a lateral recess; said flange and recess being formed with the load-bearing seat *a*, nearly normal to the web of the rail, the parts being forced together by pressure, and secured substantially as set forth.

15. The method of combining the parts 1.

and 2 of railway rails, which consists of forming one of said parts with a slightly wedging lateral flange and the other with a corresponding lateral recess of smaller size than the flange, the upper and lower faces of which flange and recess constitute the pressure-inducing and load-bearing faces $b$ and $a$, and subsequently forcing the flange into the recess by heavy pressure bringing and maintaining great pressure upon the load-bearing and pressure-inducing surfaces $a$ and $b$, making them seize and hold tightly together and prevent wear of the same.

16. The method of combining the parts 1 and 2, of railway rails, which consists of forming one of said parts with a slightly wedging lateral flange and the other with a corresponding lateral recess of smaller size than the flange, said flange and recess being formed with the load-bearing and pressure-inducing surfaces $a$ and $b$; then suitably adapting the sizes of the flange and recess to each other; and subsequently forcing the flange into the recess by heavy pressure and securing them, substantially in the manner explained; whereby great pressure is brought and maintained upon the load-bearing and pressure-inducing surfaces $a$ and $b$, causing them to wedge and hold tightly together and preventing wear of the same.

ALBERT H. EMERY.

Witnesses:
 HERVEY S. KNIGHT,
 ALBERT H. EMERY, Jr.